US008711320B2

(12) United States Patent
Arai

(10) Patent No.: US 8,711,320 B2
(45) Date of Patent: Apr. 29, 2014

(54) MOUNTING STRUCTURE, ELECTRO-OPTICAL APPARATUS, AND TOUCH PANEL

(75) Inventor: Kenji Arai, Nagano (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 468 days.

(21) Appl. No.: 12/892,369

(22) Filed: Sep. 28, 2010

(65) Prior Publication Data

US 2011/0079501 A1    Apr. 7, 2011

(30) Foreign Application Priority Data

Oct. 6, 2009   (JP) .............................. P2009-232326

(51) Int. Cl.
G02F 1/1345   (2006.01)
H01H 9/18    (2006.01)

(52) U.S. Cl.
USPC .......................... 349/155; 200/600; 349/152

(58) Field of Classification Search
USPC .......... 174/254, 261; 200/5 A, 600, 511, 512, 200/310–317, 341; 345/204; 349/90, 150, 349/152, 154, 187, 189; 361/679.01, 361/679.21, 749, 767, 769, 771, 773, 774, 361/776, 779, 784, 787, 789, 790
See application file for complete search history.

(56) References Cited

U.S. PATENT DOCUMENTS

| | | | |
|---|---|---|---|
| 5,592,365 A * | 1/1997 | Sugimoto et al. ............. | 361/789 |
| 5,799,392 A * | 9/1998 | Mishiro ......................... | 29/830 |
| 6,198,522 B1 * | 3/2001 | Yanagi .......................... | 349/152 |
| 6,409,866 B1 * | 6/2002 | Yamada ........................ | 156/219 |
| 6,791,634 B2 * | 9/2004 | Ichioka et al. ................ | 349/55 |
| 7,492,434 B2 * | 2/2009 | Kudo et al. ................... | 349/152 |
| 7,929,101 B2 * | 4/2011 | Shinn et al. .................. | 349/150 |
| 7,989,029 B1 * | 8/2011 | Dhau et al. .................. | 427/337 |
| 8,289,719 B2 * | 10/2012 | Shinn et al. .................. | 361/749 |
| 2003/0164919 A1 | 9/2003 | Oh et al. | |
| 2007/0023876 A1 | 2/2007 | Nakamura et al. | |
| 2010/0060601 A1 * | 3/2010 | Oohira ......................... | 345/173 |
| 2010/0261012 A1 * | 10/2010 | Huang et al. ................ | 428/337 |

FOREIGN PATENT DOCUMENTS

| | | |
|---|---|---|
| JP | 2001-077154 | 3/2001 |
| JP | 2003-131253 | 5/2003 |
| JP | 2003-255849 | 9/2003 |
| JP | 2004-025757 | 1/2004 |
| JP | 2004-361443 | 12/2004 |
| JP | 2006-269463 | 10/2006 |
| JP | 2007-035869 | 2/2007 |
| JP | 2008-233471 | 10/2008 |
| WO | 2009008029 | 1/2009 |

* cited by examiner

*Primary Examiner* — Renee S Luebke
(74) *Attorney, Agent, or Firm* — K&L Gates LLP

(57) ABSTRACT

A mounting structure includes a first member that includes a first electrode, a second member that includes a second electrode facing the first electrode, and an anisotropic conductive material that includes conductive particles electrically connecting the first electrode and the second electrode by being deformed between the first electrode and the second electrode. The first electrode is positioned in a bottom portion of an opening portion of an insulating layer that is formed in the first member. At least a part of the periphery of the opening portion of the insulating layer overlaps with the second electrode in a plan view. Also, a particle diameter of the conductive particles is equal to or more than twice a depth value of the opening portion.

6 Claims, 5 Drawing Sheets

MOUNTING STRUCTURE, ELECTRO-OPTICAL APPARATUS, AND TOUCH PANEL

CROSS REFERENCES TO RELATED APPLICATIONS

The present application claims priority to Japanese Priority Patent Applications JP 2009-232326 filed in the Japan Patent Office on Oct. 6, 2009, the entire contents of which is hereby incorporated by reference.

BACKGROUND

The present disclosure relates to a mounting structure using an anisotropic conductive material and an electro-optical apparatus and a touch panel that include the mounting structure.

In electronic apparatuses such as cellular phones, car navigation systems, personal computers, ticket-vending machines, and banking terminals, input function-added electro-optical apparatuses, in which an input device termed a touch panel is arranged on the surface of an electro-optical apparatus, allowing a user to input information while referring to an image displayed in an image display area of the electro-optical apparatus, are used. In such input function-added electro-optical apparatuses, electronic apparatuses in which a semiconductor IC or a flexible substrate is mounted in a substrate for the electro-optical apparatus or a substrate for a touch panel, and an anisotropic conductive material is used for such mounting are widely used.

Here, for the case of the anisotropic conductive material, in order to decrease a resistance value between the electrodes, the conductive particles are securely pressed between the electrodes so as to be deformed. Thus, configuring the unevenness of the electrode surface to be equal to or less than ⅔ of the particle diameter of the conductive particles is proposed (see JP-A-2003-255849).

In addition, when the first electrode positioned in the bottom portion of the opening portion of the insulating layer formed on the substrate and the second electrode that is a flexible substrate are electrically connected to each other by an anisotropic conductive material, making the size of the opening portion to be larger than the second electrode and configuring the depth of the opening portion, the particle diameter of conductive particles, and the thickness of the second electrode to have a predetermined dimensional relationship is proposed (see JP-A-2008-233471).

SUMMARY

In such a mounting structure, in a case where the first electrode located on the substrate side is positioned in the bottom portion of the opening portion of the insulating layer, when at least a portion of the periphery of the opening portion of the insulating layer overlaps with the second electrode that is located on the semiconductor IC side or the flexible substrate side, there is a problem in that conductive particles are not sufficiently pressed inside the opening portion and resistance between the electrodes is high. However, it is difficult to solve such a problem by using the technology disclosed in JP-A-2003-255849 or JP-A-2008-233471. In other words, in the technology disclosed in JP-A-2003-255849, it is premised that the insulating layer does not exist on the periphery of the first electrode. In addition, in the technology disclosed in JP-A-2008-233471, it is premised that the entirety of the second electrode overlaps with the opening portion. Therefore, a solving means for the above-described problem is not acquired.

Thus, it is desirable to provide a mounting structure capable of sufficiently pressing the conductive particles inside the opening portion even in a case where the first electrode and the second electrode are electrically connected to each other by an anisotropic conductive material inside the opening portion of the insulating layer and an electro-optical apparatus and a touch panel that includes the mounting structure.

In an embodiment, when the first electrode of the first member and the second electrode of the second member are electrically connected to each other through an anisotropic conductive material, the first electrode is positioned in a bottom portion of an opening portion of an insulating layer that is formed in the first member, and the conductive particles are pressed to a degree, which is equal to or higher than a predetermined degree, inside the opening portion even in a case where at least a part of the periphery of the opening portion of the insulating layer overlaps with the second electrode in the plan view, and which exhibits a good result. In other words, a gist of the present invention resides in the following configuration for pressing the conductive particles such that they are deformed to half or less of their size inside the opening portion.

According to an embodiment, there is provided a mounting structure including: a first member that includes a first electrode; a second member that includes a second electrode facing the first electrode; and an anisotropic conductive material that includes conductive particles electrically connecting the first electrode and the second electrode by being deformed between the first electrode and the second electrode. The first electrode is positioned in a bottom portion of an opening portion of an insulating layer that is formed in the first member, at least a part of the periphery of the opening portion of the insulating layer overlaps with the second electrode in a plan view, and the particle diameter of the conductive particles is equal to or more than twice a depth value of the opening portion.

According to the above-described mounting structure, at least a part of a portion of the insulating layer that is positioned on the periphery of the opening portion overlaps with the second electrode in the plan view. Accordingly, when the second member is pressed to the first member, the second electrode is brought into contact with the insulating layer. Therefore, the conductive particles are prevented from being deformed further inside the opening portion. Even in such a case, the particle diameter of the conductive particles before deformation is equal to or more than twice the depth value of the opening portion. Accordingly, the conductive particles are pressed between the first electrode and the second electrode so as to be deformed by over 50% inside the opening portion before the second electrode is brought into contact with the insulating layer. Thus, even in a case where the second electrode is brought into contact with the insulating layer, the conductive particles can be sufficiently deformed. Therefore, the resistance value between the electrodes can be decreased.

The embodiment can be applied to a case where the second member is a flexible substrate or a semiconductor IC.

In the above-described mounting structure, it is preferable that the second member is a flexible substrate in which the second electrode is formed in a base material film having a thickness of 15 μm or less. In such a configuration, the second member (the flexible substrate) has a thickness of the base material film that is thin enough to be equal to or less than 15 μm and can be easily bent. Accordingly, when the second member is pressed to the first member, even in a case where the conductive particles are interposed between the second electrode and the insulating layer, the second member (the flexible substrate) is bent such that the second electrode enters inside the opening portion. Accordingly, even inside the opening portion, the conductive particles are pressed between the first electrode and the second electrode so as to be sufficiently deformed. Therefore, the resistance value between the electrodes can be decreased.

In the above-described mounting structure, it is preferable that the second member is a flexible substrate in which the second electrode is formed in a base material film having an elastic modulus of 0.8 Gpa or less. In such a configuration, the second member (the flexible substrate) has an elastic modulus for the base material film that is low enough to be equal to or less than 0.8 Gpa and can be easily bent. Accordingly, when the second member is pressed to the first member, even in a case where the conductive particles are interposed between the second electrode and the insulating layer, the second member (the flexible substrate) is bent such that the second electrode enters inside the opening portion. Accordingly, even inside the opening portion, the conductive particles are pressed between the first electrode and the second electrode so as to be sufficiently deformed. Therefore, the resistance value between the electrodes can be decreased.

According to another embodiment, there is provided a mounting structure including: a first member that includes a first electrode; a second member that includes a second electrode facing the first electrode; and an anisotropic conductive material that includes conductive particles electrically connecting the first electrode and the second electrode by being deformed between the first electrode and the second electrode. The first electrode is positioned in a bottom portion of an opening portion of an insulating layer that is formed in the first member, at least a part of the periphery of the opening portion of the insulating layer overlaps with the second electrode in a plan view, and the second member is a flexible substrate in which the second electrode is formed in a base material film having a thickness of 15 μm or less.

According to the above-described mounting structure, the second member (the flexible substrate) has a thickness of the base material film that is thin enough to be equal to or less than 15 μm and can be easily bent. Accordingly, when the second member is pressed to the first member, even in a case where the conductive particles are interposed between the second electrode and the insulating layer, the second member (the flexible substrate) is bent such that the second electrode enters inside the opening portion. Accordingly, even inside the opening portion, the conductive particles are pressed between the first electrode and the second electrode so as to be sufficiently deformed. Therefore, the resistance value between the electrodes can be decreased.

According to another embodiment, there is provided a mounting structure including: a first member that includes a first electrode; a second member that includes a second electrode facing the first electrode; and an anisotropic conductive material that includes conductive particles electrically connecting the first electrode and the second electrode by being deformed between the first electrode and the second electrode. The first electrode is positioned in a bottom portion of an opening portion of an insulating layer that is formed in the first member, at least a part of the periphery of the opening portion of the insulating layer overlaps with the second electrode in a plan view, and the second member is a flexible substrate in which the second electrode is formed in a base material film having an elastic modulus of 0.8 Gpa or less.

According to the above-described mounting structure, the second member (the flexible substrate) has an elastic modulus for the base material film that is low enough to be equal to or less than 0.8 Gpa and can be easily bent. Accordingly, when the second member is pressed to the first member, even in a case where the conductive particles are interposed between the second electrode and the insulating layer, the second member (the flexible substrate) is bent such that the second electrode enters inside the opening portion. Accordingly, even inside the opening portion, the conductive particles are pressed between the first electrode and the second electrode so as to be sufficiently deformed. Therefore, the resistance value between the electrodes can be decreased.

The mounting structure according to the embodiment, for example, can be employed in an electro-optical apparatus. In such a case, the first member is a substrate for an electro-optical apparatus in which a pixel electrode is formed. In addition, the mounting structure according to the embodiment can be employed in a touch panel. In such a case, the first member is a substrate for a touch panel in which a position detecting electrode is formed. The electro-optical apparatus and the touch panel that are described above may be combined together so as to be configured as an input device-attached electro-optical apparatus. Such an input device-attached electro-optical apparatus is used in an electronic apparatus such as a cellular phone, a car navigation system, a personal computer, a ticket-vending machine, or a banking terminal.

Additional features and advantages are described herein, and will be apparent from the following Detailed Description and the figures.

DETAILED DESCRIPTION

Figure 1A:
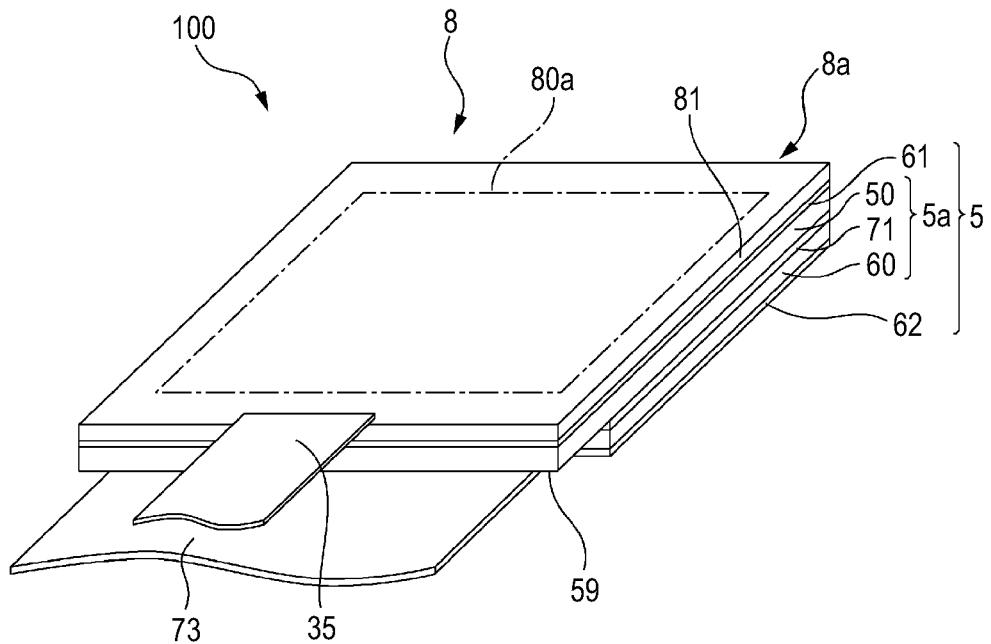
FIGS. 1A and 1B are schematic diagrams illustrating an input device-attached electro-optical apparatus in which a mounting structure according to an embodiment is used.

Embodiments will be described with reference to the accompanying drawings. In the drawings referred to in the description presented below, in order to allow each layer or each member to be of a recognizable size in the drawings, the scales of the layers or the members are differently set. Hereinafter, after a basic configuration that is common to the embodiments is described, detailed description of each embodiment will be given.

Entire Configuration of Input Device-Attached Electro-optical Apparatus

Figure 1B:
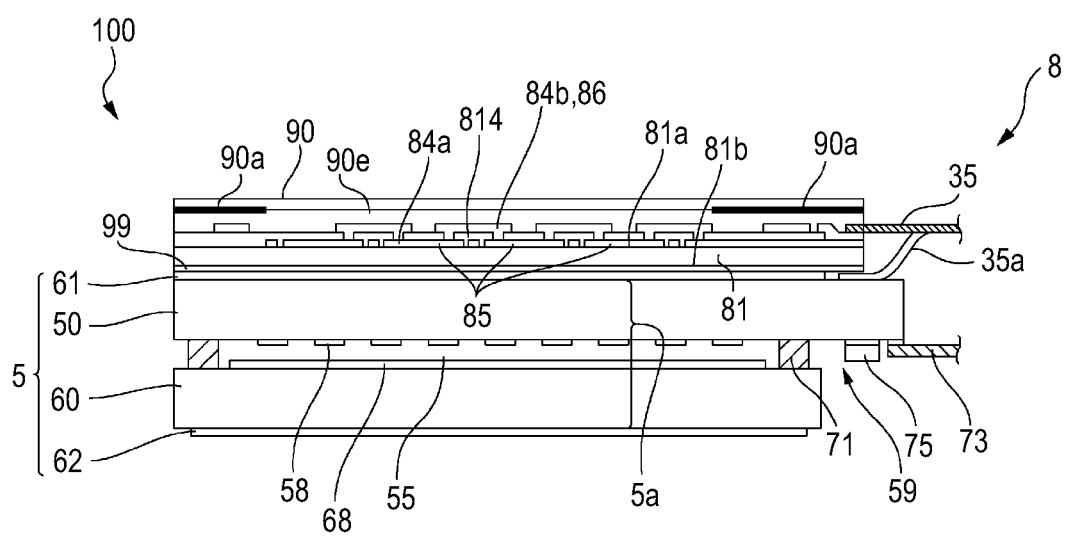

FIGS. 1A and 1B are schematic diagrams illustrating an input device-attached electro-optical apparatus in which a mounting structure according to an embodiment is used. FIGS. 1A and 1B schematically represent the entire configuration and the cross-sectional configuration of the input device-attached electro-optical apparatus.

As represented in FIG. 1A, generally, the input device-attached electro-optical apparatus 100 has an image generating device 5 that is configured by a liquid crystal device or the like and an electrostatic capacitance-type input device 8 that is disposed on a face of the image generating device 5, which emits display light, in an overlapping manner. The electrostatic capacitance-type input device 8 includes an input panel 8a (touch panel), and the image generating device 5 includes a liquid crystal panel serving as an electro-optical panel 5a (display panel). In this embodiment, both the input panel 8a and the electro-optical panel 5a have a planar shape of a rectangle, and the center area of the electrostatic capacitance-type input device 8 and the input device-attached electro-optical apparatus 100 in the plan view is an input area 80a. In addition, an area in which the image generating device 5 and the input area 80a of the input device-attached electro-optical apparatus 100 overlap with each other in the plan view is an image forming area.

In FIGS. 1A and 1B, the image generating device 5 is an active matrix-type liquid crystal display device of transmission type or semi-transmission reflection type. On a side (a side opposite to the display light output side) of the electro-optical panel 5a that is opposite to a side on which the input panel 8a is disposed, a back light device (not shown in the figure) is disposed. In the image generating device 5, on the display-light output side of the electro-optical panel 5a, a first polarizing plate 61 is disposed in an overlapping manner. In addition, on the opposite side, a second polarizing plate 62 is disposed in an overlapping manner. Thus, the electrostatic capacitance-type input device 8 is bonded to the first polarizing plate 61 by using a translucent adhesive agent (not shown in the figure) such as an acrylic resin.

The electro-optical panel 5a includes a translucent component substrate 50 that is disposed on a side opposite to the display light output side and a translucent opposing substrate 60 that is disposed so as to face the component substrate 50. The opposing substrate 60 and the component substrate 50 are bonded together by a rectangular frame-shaped sealing member 71, and a liquid crystal layer 55 is maintained within an area between the opposing substrate 60 and the component substrate 50 that is surrounded by the sealing member 71. On a face of the component substrate 50 that faces the opposing substrate 60, a plurality of pixel electrodes 58 are formed by a translucent conductive film such as an ITO (Indium Tin Oxide) film. In addition, on a face of the opposing substrate 60 that faces the component substrate 50, a common electrode 68 is formed by a translucent conductive film such as an ITO film. When the image generating device 5 is the IPS (In Plane Switching) type or the FFS (Fringe Field Switching) type, the common electrode 68 is disposed on the component substrate 50 side. The component substrate 50 may be disposed on the display light output side of the opposing substrate 60. A driving IC 75 is built in an overhang area 59 of the component substrate 50 that overhangs from the edge of the opposing substrate 60 by using a COG technique, and the flexible substrate 73 is bonded to the overhang area 59. On the component substrate 50, a driving circuit may be formed simultaneously with a switching device disposed on the component substrate 50.

The input panel 8a of the electrostatic capacitance-type input device 8 includes a translucent touch panel substrate 81 that is configured by a glass plate, a plastic plate, or the like. In this embodiment, as the touch panel substrate 81, a glass substrate is used. On a first face 81a of the touch panel substrate 81, a first conductive film 84a, an interlayer insulating film 814, and a second conductive film 84b are formed from the lower layer side toward the upper layer side viewed from the touch panel substrate 81. In this embodiment, an input position detecting electrode 85 is formed by at least one of the first conductive film 84a and the second conductive film 84b. In addition, a relay electrode 86 that is electrically connected to a discontinued portion of the input position detecting electrode 85 is formed by the other of the first conductive film 84a and the second conductive film 84b.

In an end portion of the touch panel substrate 81, a flexible substrate 35 is connected to the first face 81a. To the first face 81a side of the touch panel substrate 81, an insulating cover 90 having translucency is attached by using an adhesive agent 90e or the like. In an area of the cover 90 that overlaps with the outer area of the first face 20a of the touch panel substrate 81, a light shielding layer 90a having an insulating property is printed. An area that is surrounded by the light shielding layer 90a is an input area 80a. The light shielding layer 90a overlaps with the outer area of the electro-optical panel 5a and shields light leaking from the light source of the image generating device 5 or the end portion of a light guiding plate thereof.

In addition, on an approximately entire face of the second face 81b of the touch panel substrate 81, a translucent conductive layer 99 is formed which prevents electromagnetic wave noise irradiated from the electro-optical panel 5a from penetrating into the input panel 8a. A branched portion 35a of the flexible substrate 35 is connected to the conductive layer 99, and a shield electric potential is applied to the conductive layer 99 through the flexible substrate 35.

Embodiment 1

Entire Configuration of Mounting Structure

Figure 2A:
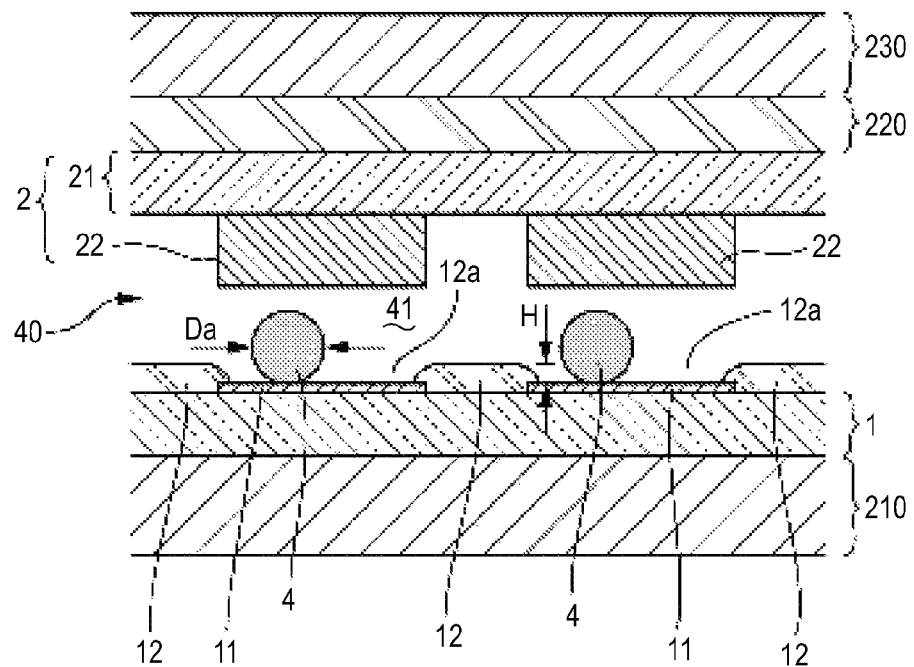
FIGS. 2A and 2B are schematic diagrams illustrating a mounting structure according to Embodiment 1.
Figure 2B:
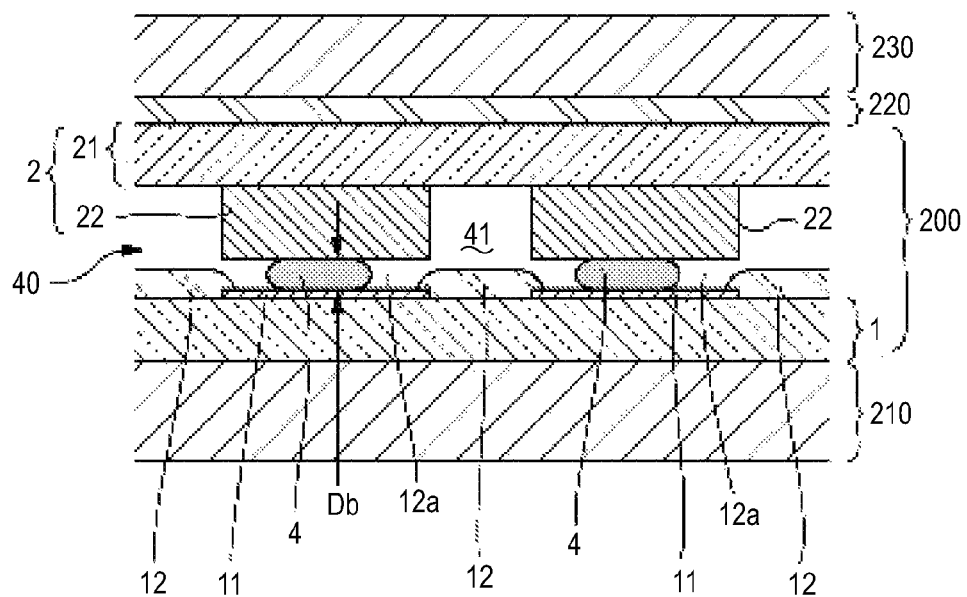

FIGS. 2A and 2B are schematic diagrams illustrating a mounting structure according to Embodiment 1. FIGS. 2A and 2B represent the appearance of the mounting structure before and after being mounted.

In the input function-added electro-optical apparatus 100 described with reference to FIGS. 1A and 1B, there are a mounting portion between the touch panel substrate 81 and the flexible substrate 35, a mounting portion between the component substrate 50 and the flexible substrate 73, and a mounting portion between the component substrate 50 and the driving IC 75. This embodiment may be applied to any one of the three portions. Thus, in the mounting structure described below, a "first member 1" and a "second member 2" have the following relationships with members of the input function-added electro-optical apparatus 100 shown in FIGS. 1A and 1B. In the mounting structure between the touch panel substrate 81 and the flexible substrate 35, first member 1=touch panel substrate 81 and second member 2=flexible substrate 35. In addition, in the mounting structure between the component substrate 50 and the flexible substrate 73, first member 1=component substrate 50 and second member 2=flexible substrate 73. In the mounting structure between the component substrate 50 and the driving IC 75, first member 1=component substrate 50 and second member 2=driving IC 75.

The mounting structure 200 shown in FIGS. 2A and 2B has a structure in which the first member 1 including a first electrode 11 and the second member 2 including a second electrode 22 that faces the first electrode 11 are mounted by an anisotropic conductive material 40. The anisotropic conductive material 40 is configured by a thermoplastic or thermosetting resin 41 and conductive particles 4 dispersed in the resin 41. The conductive particles 4 are formed by coating the surface of resin particles with a metal layer.

In order to configure the mounting structure 200, as represented in FIG. 2A, in the state in which the first member 1 is placed on a stage 210, the second member 2 is disposed such that the first electrode 11 and the second electrode 22 face each other. Thereafter, as represented in FIG. 2B, the second member 2 is pressed to the first member 1 by a press head 230. At that time, a sheet 220 formed from a fluorine resin or the like is disposed between the second member 2 and the press head 230. As a result, the conductive particles 4 are pressed between the first electrode 11 and the second electrode 22. Here, in a case where the resin 41 has a thermosetting property, the resin 41 is cured by being heated by the press head 230. On the other hand, in a case where the resin 41 has a thermoplastic property, the resin 41 is melted by being heated by the press head 230, and then the press head 230 is separated from the second member 2 so as to cool and solidify the resin 41.

Figure 3:
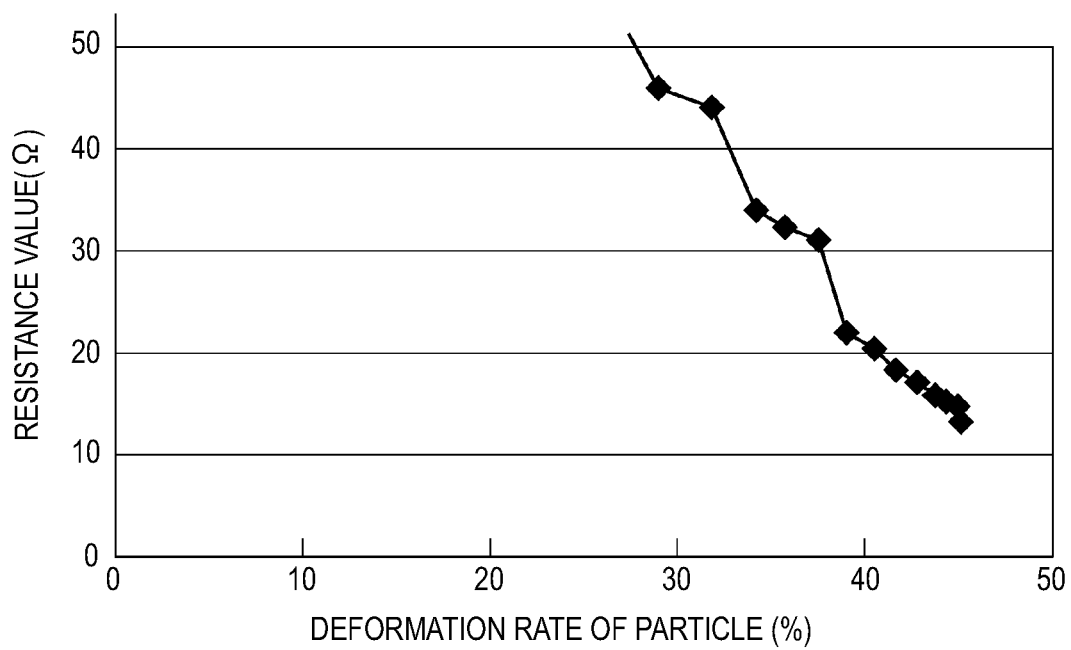
FIG. 3 is a graph representing the relationship between the deformation rate of conductive particles included in the anisotropic conductive material used in a mounting structure according to an embodiment and a resistance value between electrodes.

Relationship Between Deformation Rate of Conductive Particles 4 and Resistance Value Between Electrodes FIG. 3 is a graph representing the relationship between the deformation rate of conductive particles included in the anisotropic conductive material used in a mounting structure according to an embodiment and a resistance value between electrodes.

As shown in FIGS. 2A and 2B, when the second member 2 is mounted in the first member 1, the conductive particles 4 are deformed between the first electrode 11 and the second electrode 22 so as to electrically connect the first electrode 11 and the second electrode 22. The relationship between the deformation rate of the conductive particles 4 included in the anisotropic conductive material 40 and the resistance value between the electrodes at that time is as shown in a graph represented in FIG. 3. Here, the deformation rate is a value acquired by using the following equation.

deformation rate=((size Db in the short diameter direction after deformation)/(particle diameter Da before deformation))×100%

The deformation rate may be represented as "deformation rate=((height value after deformation)/(height value before deformation))×100%".

As represented in FIG. 3, as the deformation rate of the conductive particles 4 increases, the resistance value between the electrodes decreases. Particularly, when the deformation rate is 50%, the resistance value becomes 10Ω or less. Thereafter, even when the deformation rate of the conductive particles 4 increases, the resistance value between the electrodes transits around 10Ω.

Thus, in this embodiment, to be described below, the deformation rate of the conductive particles 4 is set to be equal to or higher than 50% regardless of the configuration of the first member 1 and the second member 2.

Detailed Configuration of Mounting Structure 200

In the mounting structure 200 of this embodiment, the second member 2 is a flexible substrate in which the second electrode 22 is formed in a base material film 21 formed from polyimide or the like. In such a second member 2, the thickness of the base material film 21, for example, is 25 μm, and the elastic modulus of the base material film 21 is 4.0 Gpa. The second electrode 22 is configured by a copper layer having a thickness of 10 μm.

In the first member 1, the first electrode 11 and an insulating layer 12 are stacked in the mentioned order. In addition, in an area of the insulating layer 12 that overlaps with the first electrode 11, an opening portion 12a is formed. Accordingly, the first electrode 11 is positioned in the bottom portion of the opening portion 12a. The insulating layer 12 is an interlayer insulating film, a planarization film, or a protection film that is formed in the touch panel substrate 81 or the component substrate 50 that is described with reference to FIGS. 1A and 1B. Such an insulating layer 12 is formed by a resin layer or the like. The film thickness of the insulating layer 12 is in the range of 2 μm to 2.5 μm as being thick. In addition, the first electrode 11 is formed from a metal layer or a translucent conductive film such as an ITO film.

Here, the opening portion 12a of the insulating layer 12 is slightly smaller than the second electrode 22. Thus, at least a part of a portion of the insulating layer 12 that is positioned on the periphery of the opening portion 12a overlaps with the second electrode 22 in the plan view. Accordingly, as shown in FIG. 2B, when the second member 2 is pressed to the first member 1 by the press head 230, the second electrode 22 is brought into contact with the insulating layer 12. Therefore, the conductive particles 4 are prevented from being deformed further inside the opening portion 12a.

Even in such a configuration, in order to set the deformation rate of the conductive particles 4 to be equal to or higher than 50%, in this embodiment, the particle diameter Da of the conductive particles 4 before deformation is set to be equal to or more than twice the depth value H of the opening portion 12a. In particular, in this embodiment, the depth value H of the opening portion 12a, for example, is 2 μm. Accordingly, the particle diameter Da of the conductive particles 4 is set to 4 μm before deformation. In addition, in this embodiment, the depth value H of the opening portion 12a corresponds to a height value from the upper face of the first electrode 11 to the opening edge of the opening portion 12a.

Accordingly, according to this embodiment, when the second member 2 is pressed to the first member 1 by the press head 230, even in a case where the second electrode 22 is brought into contact with the insulating layer 12, before that, the conductive particles 4 are pressed up to 2 μm between the first electrode 11 and the second electrode 22 inside the opening portion 12a. Therefore, the deformation rate of the conductive particles 4 can be set to 50%.

Main Advantages of this Embodiment

As described above, according to this embodiment, at least a part of a portion of the insulating layer 12 that is positioned on the periphery of the opening portion 12a overlaps with the second electrode 22 in the plan view. Accordingly, when the second member 2 is pressed to the first member 1, the second electrode 22 is brought into contact with the insulating layer 12. Therefore, the conductive particles 4 are prevented from being deformed further inside the opening portion 12a. Even in such a case, the particle diameter Da of the conductive particles 4 before deformation is equal to or more than twice the depth value H of the opening portion 12a. Accordingly, the conductive particles 4 are deformed by over 50% before the second electrode 22 is brought into contact with the insulating layer 12. Thus, according to this embodiment, even in a case where the second electrode 22 is brought into contact with the insulating layer 12, the conductive particles 4 can be sufficiently deformed. Therefore, the resistance value between the electrodes can be decreased.

Embodiment 2

Entire Configuration of Mounting Structure

Figure 4A:
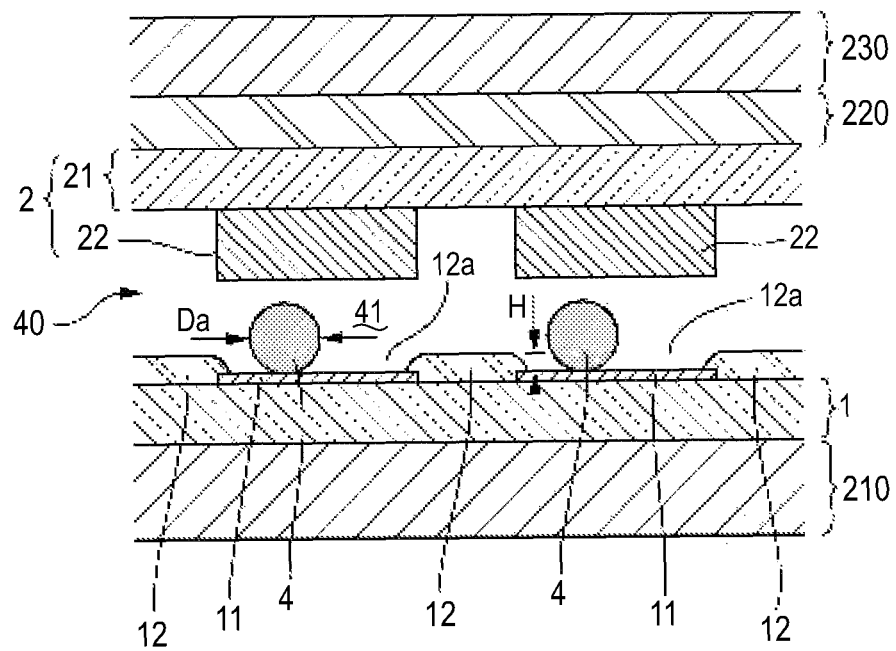
FIGS. 4A and 4B are schematic diagrams illustrating a mounting structure according to Embodiment 2.
Figure 4B:
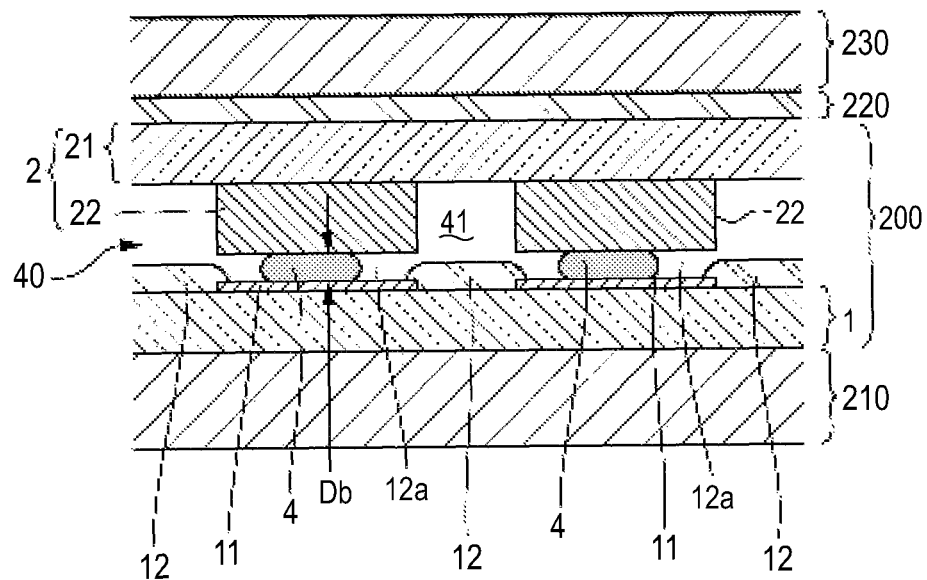

FIGS. 4A and 4B are schematic diagrams illustrating a mounting structure according to Embodiment 2. FIGS. 4A and 4B represent the appearance of the mounting structure before and after being mounted. The basic configuration of this embodiment is common to that of Embodiment 1. Thus, each common portion will be described by assigning the same reference sign thereto.

In the input function-added electro-optical apparatus 100 described with reference to FIGS. 1A and 1B, there are a mounting portion between the touch panel substrate 81 and the flexible substrate 35, a mounting portion between the component substrate 50 and the flexible substrate 73, and a mounting portion between the component substrate 50 and the driving IC 75. This embodiment may be applied to the mounting portion between the touch panel substrate 81 and the flexible substrate 35 and the mounting portion between the component substrate 50 and the flexible substrate 73, out of the above-described three portions. Thus, in the mounting structure described below, a "first member 1" and a "second member 2" have the following relationship with members of the input function-added electro-optical apparatus 100 shown in FIGS. 1A and 1B. In the mounting structure between the touch panel substrate 81 and the flexible substrate 35, first member 1=touch panel substrate 81 and second member 2=flexible substrate 35. In addition, in the mounting structure between the component substrate 50 and the flexible substrate 73, first member 1=component substrate 50 and second member 2=flexible substrate 73.

The mounting structure 200 shown in FIGS. 4A and 4B has a structure in which the first member 1 including a first electrode 11 and the second member 2 including a second electrode 22 that faces the first electrode 11 are mounted by an anisotropic conductive material 40. The anisotropic conductive material 40 is configured by a thermoplastic or thermosetting resin 41 and conductive particles 4 dispersed in the resin 41. The conductive particles 4 are formed by coating the surfaces of the resin particles with a metal layer.

In order to configure the mounting structure 200, as represented in FIG. 4A, in the state in which the first member 1 is placed on a stage 210, the second member 2 is disposed such that the first electrode 11 and the second electrode 22 face each other. Thereafter, as represented in FIG. 4B, the second member 2 is pressed to the first member 1 by a press head 230. At that time, a sheet 220 formed from a fluorine resin or the like is disposed between the second member 2 and the press head 230. As a result, the conductive particles 4 are pressed between the first electrode 11 and the second electrode 22. Here, in a case where the resin 41 has a thermosetting property, the resin 41 is cured by being heated by the press head 230. On the other hand, in a case where the resin 41 has a thermoplastic property, the resin 41 is melted by being heated by the press head 230, and then the press head 230 is separated from the second member 2 so as to cool and solidify the resin 41.

As a result, the conductive particles 4 are deformed between the first electrode 11 and the second electrode 22 so as to electrically connect the first electrode 11 and the second electrode 22. According to the relationship between the deformation rate of the conductive particles 4 included in the anisotropic conductive material 40 and the resistance value between the electrodes at that time, as described with reference to FIG. 3, as the deformation rate of the conductive particles 4 is increased, the resistance value between the electrodes decreases. Particularly, when the deformation rate is 50%, the resistance value becomes 10Ω or less. Thereafter, even when the deformation rate of the conductive particles 4 increases, the resistance value between the electrodes transits around 10Ω.\

Detailed Configuration of Mounting Structure 200

Figure 5A:
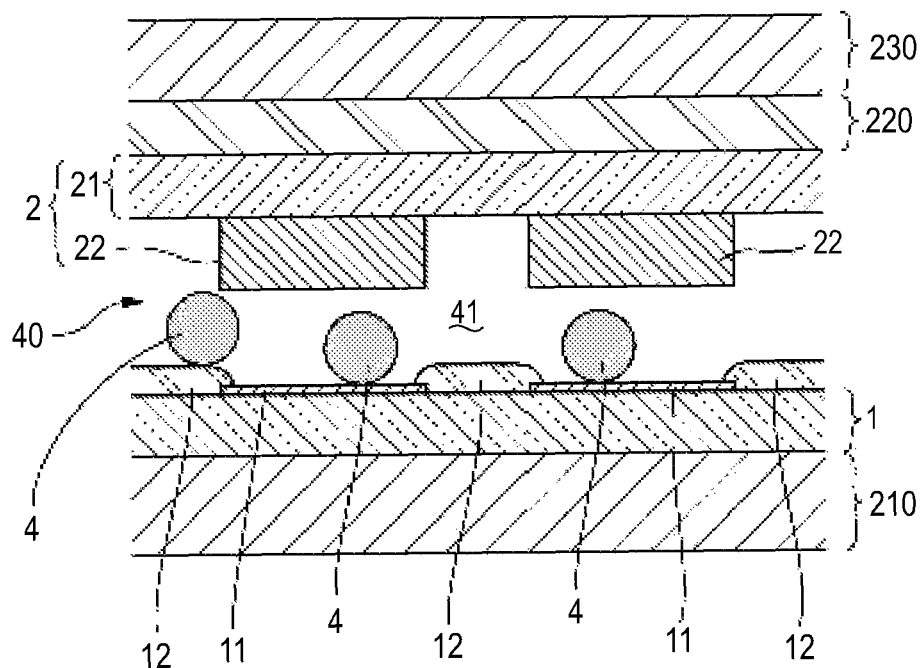
FIGS. 5A and 5B are schematic diagrams illustrating the characteristics of a mounting structure according to Embodiment 2.
Figure 5B:
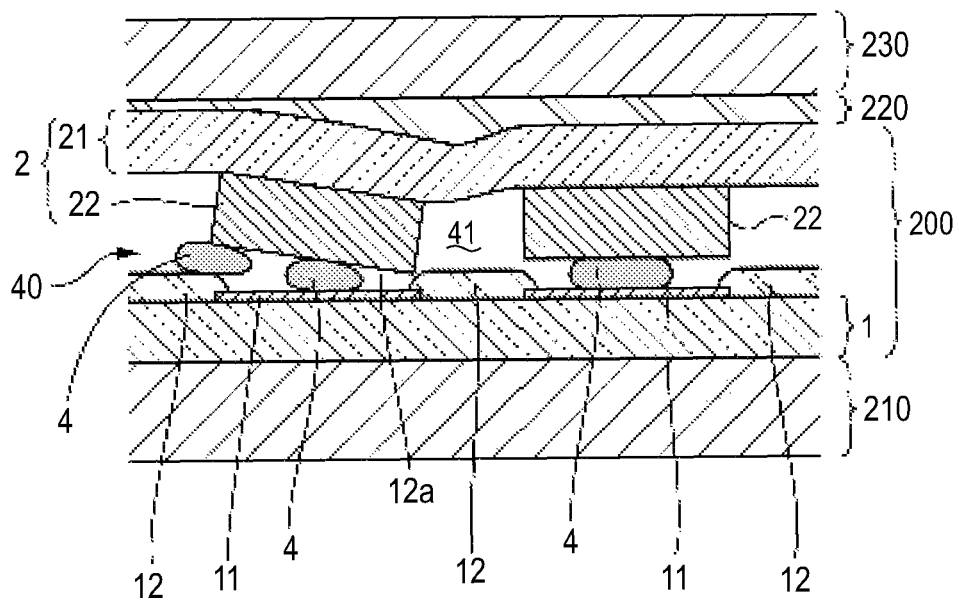

FIGS. 5A and 5B are schematic diagrams illustrating the characteristics of a mounting structure according to Embodiment 2. FIGS. 5A and 5B represent the appearance of the mounting structure before and after being mounted.

In the mounting structure 200 of this embodiment, the second member 2 is a flexible substrate in which the second electrode 22 is formed in a base material film 21 formed from polyimide or the like. In such a second member 2, the elastic modulus of the base material film 21 is 4.0 Gpa, and the thickness of the base material film 21 is 15 μm or less. Accordingly, the second member 2 (flexible substrate) can be bent more easily than an ordinary flexible substrate (the thickness of the base material film 21 is 25 μm) by about 40%. In addition, the second electrode 22 is configured by a copper layer having a thickness of 10 μm.

In the first member 1, the first electrode 11 and an insulating layer 12 are stacked in the mentioned order. In addition, in an area of the insulating layer 12 that overlaps with the first electrode 11, an opening portion 12a is formed. Accordingly, the first electrode 11 is positioned in the bottom portion of the opening portion 12a. The insulating layer 12 is an interlayer insulating film, a planarization film, or a protection film that is formed in the touch panel substrate 81 or the component substrate 50 that is described with reference to FIGS. 1A and 1B. Such an insulating layer 12 is formed by a resin layer or the like. The film thickness of the insulating layer 12 is in the range of 2 μm to 2.5 μm as being thick. In addition, the first electrode 11 is formed from a metal layer or a translucent conductive film such as an ITO film.

Here, the opening portion 12a of the insulating layer 12 is slightly smaller than the second electrode 22. Thus, at least a part of a portion of the insulating layer 12 that is positioned on the periphery of the opening portion 12a overlaps with the second electrode 22 in the plan view. Accordingly, as shown in FIG. 4B, when the second member 2 is pressed to the first member 1 by the press head 230, the second electrode 22 is brought into contact with the insulating layer 12. Therefore, the conductive particles 4 are prevented from being deformed further inside the opening portion 12a.

Thus, the particle diameter Da of the conductive particles 4 before deformation is set to be equal to or more than twice the depth value H of the opening portion 12a. In particular, in this embodiment, the depth value H of the opening portion 12a, for example, is 2 μm, and accordingly, the particle diameter Da of the conductive particles 4 before deformation is set to 4 μm. Accordingly, according to this embodiment, when the second member 2 is pressed to the first member 1 by the press head 230, even in a case where the second electrode 22 is brought into contact with the insulating layer 12, before that, the conductive particles 4 are pressed up to 2 μm between the first electrode 11 and the second electrode 22 inside the opening portion 12a. Therefore, the deformation rate of the conductive particles 4 can be set to 50%.

In addition, as shown in FIG. 5A, when the second member 2 is pressed to the first member 1, in a case where the conductive particles 4 are interposed between the second electrode 22 and the insulating layer 12, it is difficult to press the conductive particles 4 between the first electrode 11 and the second electrode 22. However, according to this embodiment, the second member 2 (the flexible substrate) has a thickness of the base material film 21 that is thin enough to be equal to or less than 15 μm and can be easily bent. Accordingly, as shown in FIG. 5B, even in a case where the conductive particles 4 are interposed between the second electrode 22 and the insulating layer 12, the second member 2 (the flexible substrate) is bent such that the second electrode 22 enters inside the opening portion 12a. Accordingly, even inside the opening portion 12a, the conductive particles 4 are pressed between the first electrode 11 and the second electrode 22 so as to be deformed until the deformation rate becomes 50%.

Main Advantages of this Embodiment

As described above, according to this embodiment, at least a part of a portion of the insulating layer 12 that is positioned on the periphery of the opening portion 12a overlaps with the second electrode 22 in the plan view. Accordingly, when the second member 2 is pressed to the first member 1, the second electrode 22 is brought into contact with the insulating layer 12. Therefore, the conductive particles 4 are prevented from being deformed further inside the opening portion 12a. Even in such a case, the particle diameter Da of the conductive particles 4 before deformation is equal to or more than twice the depth value H of the opening portion 12a. Accordingly, the conductive particles 4 are deformed by over 50% before the second electrode 22 is brought into contact with the insulating layer 12. Thus, according to this embodiment, even in a case where the second electrode 22 is brought into contact with the insulating layer 12, the conductive particles 4 can be sufficiently deformed. Therefore, the resistance value between the electrodes can be decreased.

In addition, as shown in FIG. 5A, when the second member 2 is pressed to the first member 1, even in a case where the conductive particles 4 are interposed between the second electrode 22 and the insulating layer 12, the second member 2 (the flexible substrate) has a thickness of the base material film 21 that is thin enough to be equal to or less than 15 μm and can be easily bent. Accordingly, as shown in FIG. 5B, the second member 2 (the flexible substrate) is bent, and the second electrode 22 enters inside the opening portion 12a. Thus, inside the opening portion 12a, the conductive particles 4 are pressed between the first electrode 11 and the second electrode 22 so as to be deformed until the deformation rate becomes 50%. Therefore, the resistance value between the electrodes can be decreased.

Embodiment 3

The basic configuration of this embodiment is common to that of Embodiment 2. Thus, similarly to Embodiment 2, the description will be made with reference to FIGS. 4A and 4B and FIGS. 5A and 5B. The mounting structure 200 of this embodiment, similarly to Embodiment 2, can be applied to any one of the mounting portion between the touch panel substrate 81 and the flexible substrate 35 and the mounting portion between the component substrate 50 and the flexible substrate 73 in the input function-added electro-optical apparatus 100 described with reference to FIGS. 1A and 1B. Thus, in the mounting structure described below, a "first member 1" and a "second member 2" have the following relationship with members of the input function-added electro-optical apparatus 100 shown in FIGS. 1A and 1B. In the mounting structure between the touch panel substrate 81 and the flexible substrate 35, first member 1=touch panel substrate 81 and second member 2=flexible substrate 35. In addition, in the mounting structure between the component substrate 50 and the flexible substrate 73, first member 1=component substrate 50 and second member 2=flexible substrate 73.

The mounting structure 200 shown in FIGS. 4A and 4B, similarly to that of Embodiment 2, has a structure in which the first member 1 including a first electrode 11 and the second member 2 including a second electrode 22 that faces the first electrode 11 are mounted by an anisotropic conductive material 40. In such a mounting structure 200, the conductive particles 4 are deformed between the first electrode 11 and the second electrode 22 so as to electrically connect the first electrode 11 and the second electrode 22. According to the relationship between the deformation rate of the conductive particles 4 included in the anisotropic conductive material 40 and the resistance value between the electrodes at that time, as described with reference to FIG. 3, as the deformation rate of the conductive particles 4 is increased, the resistance value between the electrodes decreases. Particularly, when the deformation rate is 50%, the resistance value becomes 10Ω or less.

In the mounting structure 200 of this embodiment, the second member 2 is a flexible substrate in which the second electrode 22 is formed in a base material film 21 formed from polyimide or the like. In such a second member 2, the thickness of the base material film 21 is 25 μm, and the elastic modulus of the base material film 21 is 0.8 Gpa or less. Accordingly, the second member 2 (flexible substrate) can be bent more easily than an ordinary flexible substrate (the elastic modulus of the base material film 21 is 4.0 Gpa) by about 40%. In addition, the second electrode 22 is configured by a copper layer having a thickness of 10 μm.

In the first member 1, the first electrode 11 and an insulating layer 12 are stacked in the mentioned order. In addition, in an area of the insulating layer 12 that overlaps with the first electrode 11, an opening portion 12a is formed. Accordingly, the first electrode 11 is positioned in the bottom portion of the opening portion 12a. Here, the opening portion 12a of the insulating layer 12 is slightly smaller than the second electrode 22. Thus, at least a part of a portion of the insulating layer 12 that is positioned on the periphery of the opening portion 12a overlaps with the second electrode 22 in the plan view. Accordingly, as shown in FIG. 4B, when the second member 2 is pressed to the first member 1 by the press head 230, the second electrode 22 is brought into contact with the insulating layer 12. Therefore, the conductive particles 4 are prevented from being deformed further inside the opening portion 12a.

Here, the particle diameter Da of the conductive particles 4 before deformation is set to be equal to or more than twice the depth value H of the opening portion 12a. In particular, in this embodiment, the depth value H of the opening portion 12a, for example, is 2 μm. Accordingly, the particle diameter Da of the conductive particles 4 is set to 4 μm before deformation. Accordingly, according to this embodiment, when the second member 2 is pressed to the first member 1 by the press head 230, even in a case where the second electrode 22 is brought into contact with the insulating layer 12, before that, the conductive particles 4 are pressed up to 2 μm between the first electrode 11 and the second electrode 22 inside the opening portion 12a. Therefore, the deformation rate of the conductive particles 4 can be set to 50%.

In addition, as shown in FIG. 5A, when the second member 2 is pressed to the first member 1, in a case where the conductive particles 4 are interposed between the second electrode 22 and the insulating layer 12, it is difficult to press the conductive particles 4 between the first electrode 11 and the second electrode 22. However, according to this embodiment, the second member 2 (the flexible substrate) has an elastic modulus for the base material film 21 that is equal to or less than 0.8 Gpa and can be easily bent. Accordingly, as shown in FIG. 5B, even in a case where the conductive particles 4 are interposed between the second electrode 22 and the insulating layer 12, the second member 2 (the flexible substrate) is bent such that the second electrode 22 enters inside the opening portion 12a. Accordingly, even inside the opening portion 12a, the conductive particles 4 are pressed between the first electrode 11 and the second electrode 22 so as to be deformed until the deformation rate becomes 50%.

Main Advantages of this Embodiment

As described above, according to this embodiment, at least a part of a portion of the insulating layer 12 that is positioned on the periphery of the opening portion 12a overlaps with the second electrode 22 in the plan view. Accordingly, when the second member 2 is pressed to the first member 1, the second electrode 22 is brought into contact with the insulating layer 12. Therefore, the conductive particles 4 are prevented from being deformed further inside the opening portion 12a. Even in such a case, the particle diameter Da of the conductive particles 4 before deformation is equal to or more than twice the depth value H of the opening portion 12a. Accordingly, the conductive particles 4 are deformed by over 50% before the second electrode 22 is brought into contact with the insulating layer 12. Thus, according to this embodiment, even in a case where the second electrode 22 is brought into contact with the insulating layer 12, the conductive particles 4 can be sufficiently deformed. Therefore, the resistance value between the electrodes can be decreased.

In addition, as shown in FIG. 5A, when the second member 2 is pressed to the first member 1, even in a case where the conductive particles 4 are interposed between the second electrode 22 and the insulating layer 12, the second member 2 (the flexible substrate) has an elastic modulus for the base material film 21 that is low enough to be equal to or less than 0.8 Gpa and can be easily bent. Accordingly, as shown in FIG. 5B, the second member 2 (the flexible substrate) is bent, and the second electrode 22 enters inside the opening portion 12a. Thus, inside the opening portion 12a, the conductive particles 4 are pressed between the first electrode 11 and the second electrode 22 so as to be deformed until the deformation rate becomes 50%. Therefore, the resistance value between the electrodes can be decreased.

Other Embodiments

In the above-described embodiments, the opening portion 12a of the insulating layer 12 is slightly smaller than the second electrode 22, and at least a part of a portion of the insulating layer 12 that is positioned around the opening portion 12a is configured to overlap with the second electrode 22 in the plan view. However, an embodiment may be applied to a case where the opening portion 12a of the insulating layer 12 is larger than the second electrode 22, and at least a part of a portion of the insulating layer 12 that is positioned on the periphery of the opening portion 12a overlaps with the second electrode 22 in the plan view due to positional mismatch or the like.

In the above-described embodiments, the first electrode 11 is formed only in the bottom portion of the opening portion 12a of the insulating layer 12. However, an embodiment may be applied to a case where the first electrode 11 is formed from the bottom portion of the opening portion 12a of the insulating layer 12 to the surface of the insulating layer 12 or a case where an auxiliary electrode is formed so as to overlap with the first electrode 11 in the bottom portion of the opening portion 12a of the insulating layer 12, and the auxiliary electrode is formed up to the surface of the insulating layer 12.

In the above-described embodiments, the liquid crystal device is used as the image generating device 5. However, an organic electroluminescent device may be used as the image generating device 5.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A mounting structure comprising:
a first member that includes a first electrode;
a second member that includes a second electrode facing the first electrode; and
an anisotropic conductive material that includes conductive particles electrically connecting the first electrode and the second electrode by being deformed between the first electrode and the second electrode,
wherein the first electrode is positioned in a bottom portion of an opening portion of an insulating layer that is formed in the first member,
wherein at least a part of a periphery of the opening portion of the insulating layer overlaps with the second electrode in a plan view,
wherein the insulating layer covers a portion of the first electrode, and
wherein a particle diameter of the conductive particles is equal to or more than twice a depth of the opening portion.

2. The mounting structure according to claim 1, wherein the second member is a flexible substrate in which the second electrode is formed in a base material film having a thickness of 15 µm or less.

3. The mounting structure according to claim 1, wherein the second member is a flexible substrate in which the second electrode is formed in a base material film having an elastic modulus of 0.8 Gpa or less.

4. A mounting structure comprising:
a first member that includes a first electrode;
a second member that includes a second electrode facing the first electrode; and
an anisotropic conductive material that includes conductive particles electrically connecting the first electrode and the second electrode by being deformed between the first electrode and the second electrode,
wherein the first electrode is positioned in a bottom portion of an opening portion of an insulating layer that is formed in the first member,
wherein at least a part of a periphery of the opening portion of the insulating layer overlaps with the second electrode in a plan view,
wherein the insulating layer covers a portion of the first electrode, and
wherein the first member is a flexible substrate in which the second electrode is formed in a base material film having an elastic modulus of 0.8 Gpa or less.

5. An electro-optical apparatus comprising:
A mounting structure comprising:
a first member that includes a first electrode;
a second member that includes a second electrode facing the first electrode; and
an anisotropic conductive material that includes conductive particles electrically connecting the first electrode and the second electrode by being deformed between the first electrode and the second electrode,
wherein the first electrode is positioned in a bottom portion of an opening portion of an insulating layer that is formed in the first member,
wherein at least a part of a periphery of the opening portion of the insulating layer overlaps with the second electrode in a plan view,
wherein the insulating layer covers a portion of the first electrode, wherein a particle diameter of the conductive particles is equal to or more than twice a depth of the opening portion, and wherein the first member is a substrate for the electro-optical apparatus in which a pixel electrode is formed.

6. A touch panel comprising:

a mounting structure including:

a first member that includes a first electrode;

a second member that includes a second electrode facing the first electrode; and an anisotropic conductive material that includes conductive particles electrically connecting the first electrode and the second electrode by being deformed between the first electrode and the second electrode, wherein the first electrode is positioned in a bottom portion of an opening portion of an insulating layer that is formed in the first member, wherein at least a part of a periphery of the opening portion of the insulating layer overlaps with the second electrode in a plan view, wherein the insulating layer covers a portion of the first electrode, wherein a particle diameter of the conductive particles is equal to or more than twice a depth of the opening portion, and wherein the first member is a substrate for the touch panel in which a position detecting electrode is formed.

\* \* \* \* \*